May 5, 1925. 1,536,921
A. PELECH
WIND MOTOR
Filed Nov. 29, 1922 3 Sheets-Sheet 2
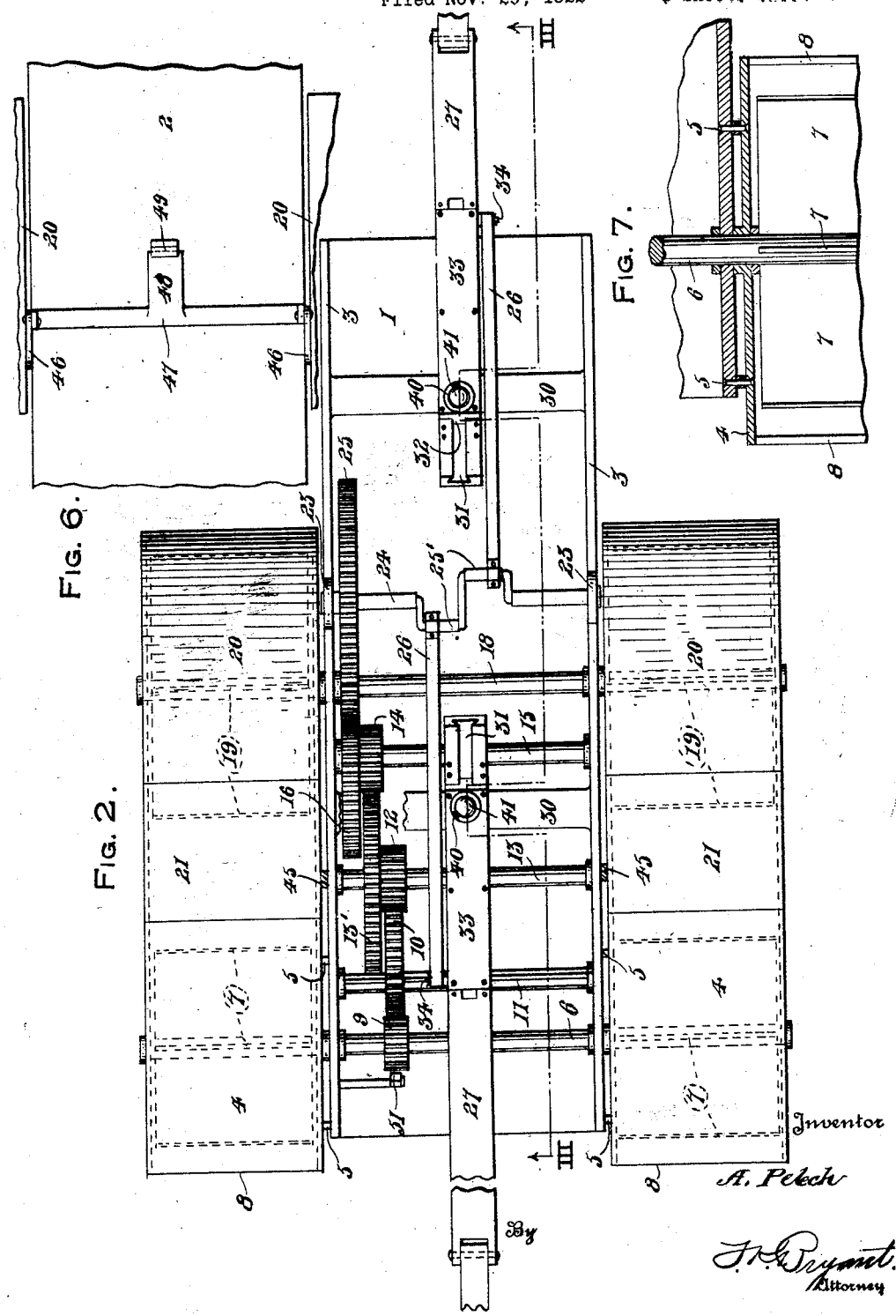
Inventor
A. Pelech
By
J. K. Bryant.
Attorney

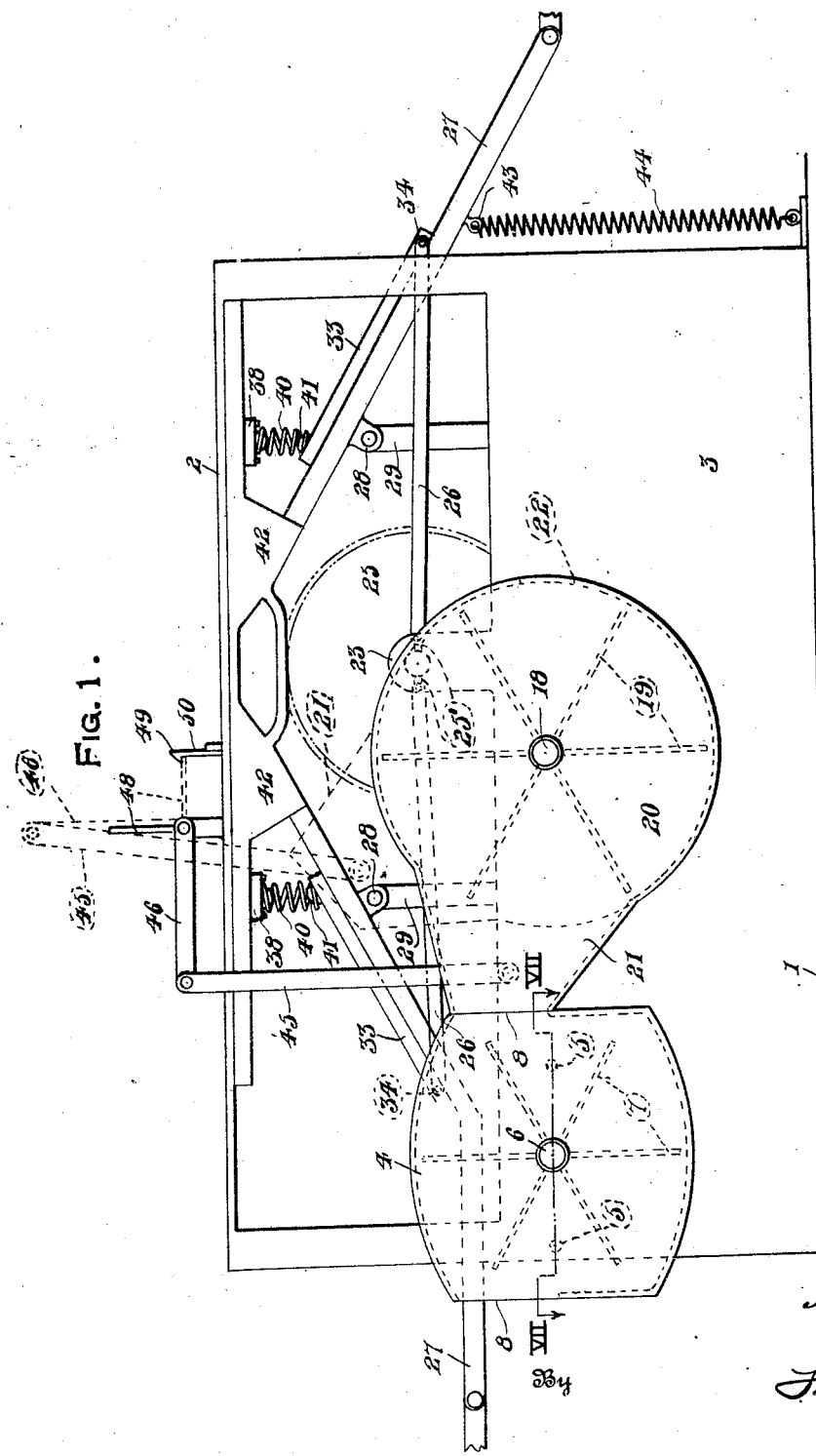

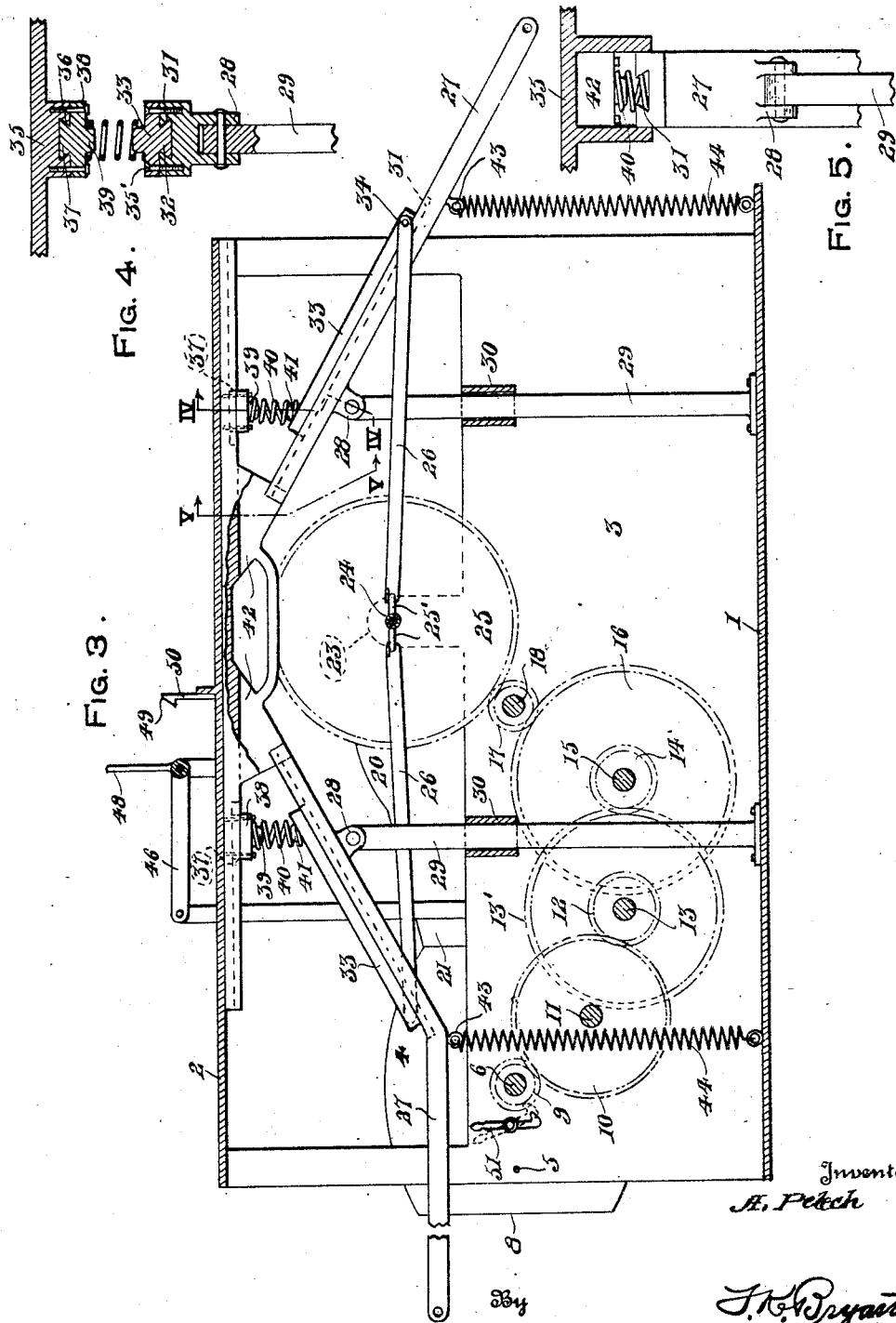

Patented May 5, 1925.

1,536,921

UNITED STATES PATENT OFFICE.

ADOLPH PELECH, OF HALLETTSVILLE, TEXAS.

WIND MOTOR.

Application filed November 29, 1922. Serial No. 604,036.

*To all whom it may concern:*

Be it known that I, ADOLPH PELECH, a citizen of the United States, residing at Hallettsville, in the county of Lavaca and State of Texas, have invented certain new and useful Improvements in Wind Motors, of which the following is a specification.

The primary object of this invention is the production of a wind motor wherein the same may be conveniently elevated upon a building or other suitable structure whereby the force of the wind may advantageously control an operating mechanism for effectively controlling a water or fluid pump mechanism.

A further object of this invention is to devise a wind motor specifically adapted for the operation of pump mechanisms wherein the same is of a comparatively simple construction and one which is not liable to readily become out of order.

With the above general objects in view and others that will appear as the nature of the invention is better understood, the same consists in the novel construction, combination and arrangement of any parts hereinafter more fully described, illustrated in the accompanying drawings and pointed out in the appended claims.

In the drawings:—

Figure 1 is a side elevational view of the motor with certain of the parts being shown in both full and dotted line positions, Figure 2 is a top plan view of the same, with the top wall of the housing removed, Figure 3 is a vertical longitudinal sectional view taken upon the line III—III of Figure 2 with portions of the device being shown in elevation and also portions of the device being shown in outline, Figure 4 is a fragmentary cross sectional view upon the line IV—IV of Figure 3 looking in the direction of the arrows, Figure 5 is a similar view upon the line V—V of the same figure and also looking in the direction of the arrows, Figure 6 is a fragmentary top plan view of a portion of the device, and Figure 7 is a fragmentary longitudinal sectional view upon the broken line VII—VII of Figure 1 and looking downward in the direction of the arrows.

Referring more in detail to the several views, there is shown a supporting housing of substantially rectangular configuration and comprising bottom and top walls 1 and 2 and skeleton side walls 3. In the preferred embodiment of the present invention the ends of this housing are left open. Adjacent the forward ends and externally of the side walls 3 are fan casings 4 shown as being secured to the side walls by rivets or bolts 5. Journaled between the side walls 3 of the housing 1 and forwardly thereof is a rotary shaft 6 having its opposite end portions journaled within the side walls of the fan housings or casings 4 and keyed or otherwise secured to these ends of the shaft are the fan or wind wheels 7 of any preferred design. The front and rear walls of the fan casings are provided with transverse openings 8 so as to permit free passage of the air therethrough for contacting with the different blades of the fan and consequently rotating the shaft 6.

Keyed upon the shaft 6 and at a convenient point thereon between the side walls 3 of the housing 1 is a relatively small spur gear 9 for meshing with a larger spur gear 10 keyed upon an idler shaft 11 positioned slightly beneath and to one side of the shaft 6 within the side walls of the housing. This latter mentioned gear wheel 10 upon the shaft 11 likewise meshes with a relatively small spur gear 12 upon another idler shaft 13 likewise journaled between the side walls of said housing 1, and adjacent this spur gear 12 is another relatively larger gear 13' meshing with a spur 14 keyed to still another idler shaft 15 journaled in a similar manner as the shafts 11 and 13. Upon this idler shaft 15 there is also a relatively larger gear wheel 16 which meshes with a smaller gear 17 upon a driving shaft 18 secured in a manner similar to the first mentioned shaft 6 and also having its ends projecting externally of the side walls 3 of the housing 1 for a purpose hereinafter more fully described.

As above mentioned, the shaft 18 has its opposite ends extending through the side walls of the housing and freely rotatable therein by any preferred manner. Keyed to these external ends of the shaft 18 are other relatively larger fan blades 19 rotatable within metallic housings 20 unsecured to the side walls of the main housing 1 and so positioned upon the ends of the shaft 18 as to rotate thereon. The forward ends of these fan housings 20 are shaped in the form of open ended projecting nozzles 21 for closely contacting the side walls of the rear transverse slots 8 in the forward fan casings 4 when the rear fan casings 20 are in their operative positions as shown in Figures 2 and 3 and in the full lines in Figure 1, in which position the air passing outwardly through the rear transverse openings in the forward casings 4 will be received within these inlet nozzles 21 of the rearward casings 20 so as to act upon the fan blades therein and causing a consequent rotation of the same and also of the operating shaft 18. The rear walls of the fan casing 20 are likewise provided with transverse slots 22 for permitting egress of the air from within these latter mentioned casings.

The skeleton side walls 3 of the main housing 1 are provided at a convenient point slightly rearwardly of the drive shaft 18 with upwardly projecting ears 23 and suitably journaled between these ear members is a crank shaft 24 having keyed thereto a relatively large gear wheel 25 adapted to mesh with the small spur gear 17 upon the drive shaft 18. It will therefore be seen that a positive drive is procured to this crank shaft 24 direct from the main drive shaft 6 and secondary drive shaft 18. The crank portions 25' of the crank shaft 24 each has a connecting rod 26 operatively secured thereto, the opposite ends of which are also operatively secured to rocking levers 27. Each rocking lever 27 carries depending ear members 28 having eyes therein for pivotally securing the rocking levers 27 to the upper ends of vertical standards 29 bolted to the bottom wall 1 of the main housing and suitably braced therein by transverse brace bars 30 extending between the upper edges of the skeleton side walls 3.

The rocking levers 27 are provided upon their upper surfaces, and for a relatively large portion of their length, with dove-tailed grooves 31 for receiving the complementary dove-tailed surface 32 of adjustable pivot bars 33, and it is to be herein noted that the forward end of the connecting rods 26 from the crank shaft 24 are pivotally secured to the adjacent forward ends of these adjustable bars 33, as at 34. It will therefore readily be seen that the leverage of the rocking levers 27 may be either increased or decreased by a consequent adjustment of the pivot bars 33, for the connecting rods 26, upon the upper surface of the bars 27 and in which adjusted position they are securely retained by set screws or the like fastening means 35'.

Suitably secured to the inner surface of the upper wall 2 of the main housing is a longitudinal strip of material 35 provided at its opposite ends with relatively long dove-tailed grooves 36 for receiving the complementary dove-tailed tongues 37 of sliding block members 38, and depending from these block members are annular tits 39 for receiving one end of a coil spring 40. The opposite ends of these springs are adapted to overlie a similar tit 41 upon each of the leaverage adjusting bars 33 for effecting a shock absorbing means for the upper ends of the rocking levers 27. It will therefore be seen that when either of the leverage adjusting bars 33 are adjusted upon the rocking levers 27 with a consequent moving of its complementary tit 41 the blocks 38 may be likewise adjusted within its slot within the member 35 and there retained by locking means similar to that employed for the slide members 33.

Adjacent the upper ends of the rocking levers 27, the longitudinally disposed strip 35 is provided with downwardly inclined inverted U-shaped channel ways 42 for effecting a guiding means for the upper ends of these rocking levers 27 when the same are rocked upon their pivots, it being noted that a portion of these rocking levers are received within the said channel ways 42. Adjacent the forward ends of the rocking levers 27 the same are provided with eye bolts 43 for receiving the upper ends of coil springs 44 for normally tensioning these ends of the rocking levers downwardly, the said opposite ends of the coil springs being suitably anchored to the bottom wall 1 of the main housing.

From the above description it will be clearly noted that the force of the wind passing through the front transverse openings 8 in the front fan casings 4 will act directly upon the fans 7 therein and thence pass outwardly of the rear transverse openings of the casing and into the inlet nozzles 21 of the rear fan casings 20 for driving the fan blades 19 therein. These separate series of fan blades being operatively connected to the drive shafts 6 and 18, which shafts control the rotary movement of the crank shaft 24 through a train of gearing hereinbefore fully described, any rotary movement of this crank shaft 24 will cause a reciprocating movement of the connecting rods 26 and a consequent rocking of the rocking levers 27 for controlling the reciprocatory movement of pump pistons which may be pivotally secured to their outer free ends.

If at any time it should be desirable to dispense with the power developed from the rear set of fan blades 19 within the casings 20, the inlet nozzles thereof may be extended to a raised position or in other words the casings so rotated upon the shaft 18 to position the inlet nozzles thereof into a position shown in dotted lines in Figure 1. As a means for accomplishing this purpose I provided connecting rods 45 pivotally secured to a convenient point upon the air inlet nozzles of the casings and extending upwardly to a position above the top wall 2 of the main housing. The upper ends of these rods are likewise pivotally secured to link members 46 which are pivotally secured together by a cross arm 47 adapted to extend across the upper wall 2. Intermediate the ends of this cross rod 47 the same is provided with an integral vertically projecting finger portion 48 adapted to engage beneath the hooked end 49 of a spring retaining member 50 when the said casings are rotated upon the shaft 18 and it is to be herein noted that the integral portion 48 of the cross rod 47 also functions as an operating handle.

If at any time it is found desirable to discontinue the operation of the windmill herein set forth, a manually operated pivoted dog member 51 may be provided with a hooked lower end for engaging within or between the teeth of the spur gear 9 on the front drive shaft 6.

While there is herein shown and described the preferred embodiment of the present invention, it is nevertheless to be understood that minor changes may be made therein without departing from the spirit and scope of the invention.

What is claimed as new is:—

1. A motor of the type described, including a housing, a pair of drive shafts journaled within said housing and having their opposite end portions projecting externally therefrom, a crank shaft rearwardly of the said drive shafts and also journaled within the housing, a rocking bar upon each side of the crank shaft and connected to the crank portions thereof by connecting rods, the said crank shaft adapted to be rotated by the said drive shafts and for imparting a rocking movement to the rocking levers.

2. A motor of the type described, including a housing, a pair of drive shafts journaled within said housing and having their opposite ends extending outwardly thereof, a pair of rocking levers within said housing adapted to be operated by said drive shafts, and means for adjusting the degree of movement of said rocking levers.

3. A motor of the type described, including a housing, a pair of rocking levers pivotally secured within said housing and adapted for attachment to the pistons of fluid pumps, a crank shaft journaled within said housing and between said rocking levers, shafts journaled within said housing so arranged as to rotate said crank shaft, and connecting means between said crank shaft and the pair of rocking levers.

4. A motor of the type described, including a housing, a pair of rocking levers pivotally secured within said housing and adapted for attachment to the pistons of fluid pumps, a crank shaft journaled within said housing and between said rocking levers, shafts journaled within said housing so arranged as to rotate said crank shaft, connecting means between said crank shaft and the pair of rocking levers, and means adjustably positioned upon the said rocking levers for controlling the degree of movement thereof.

5. In a power transmission device, a crank shaft, a rocking bar at one side of the crank shaft and inclined to the horizontal, a pivotal support for said rocking bar adjacent its upper end, a sliding member extending longitudinally downward along said rocking bar from a point adjacent its upper end, means to secure said sliding member in adjusted position on said rocking bar, a link connecting the lower end of the sliding member with the crank shaft, a frame member above said rocking bar, a spring seat slidable along the frame member, and a spring having its upper end bearing against the spring seat and its lower end resting on the upper part of the sliding member.

In testimony whereof I affix my signature.

ADOLPH PELECH.